United States Patent
Aides et al.

(10) Patent No.: US 11,176,417 B2
(45) Date of Patent: Nov. 16, 2021

(54) METHOD AND SYSTEM FOR PRODUCING DIGITAL IMAGE FEATURES

(71) Applicant: International Business Machines Corporation, Armonk, NY (US)

(72) Inventors: Amit Aides, Haifa (IL); Amit Alfassy, Haifa (IL); Leonid Karlinsky, Mazkeret Batya (IL); Joseph Shtok, Binyamina (IL)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 16/594,024

(22) Filed: Oct. 6, 2019

(65) Prior Publication Data
US 2021/0103771 A1 Apr. 8, 2021

(51) Int. Cl.
  *G06K 9/62* (2006.01)
  *G06N 3/04* (2006.01)
  *G06N 3/08* (2006.01)

(52) U.S. Cl.
  CPC ........... *G06K 9/6256* (2013.01); *G06K 9/627* (2013.01); *G06K 9/628* (2013.01); *G06K 9/6262* (2013.01); *G06N 3/04* (2013.01); *G06N 3/08* (2013.01)

(58) Field of Classification Search
  CPC .... G06K 9/6256; G06K 9/6262; G06K 9/627; G06K 9/628
  See application file for complete search history.

(56) References Cited

U.S. PATENT DOCUMENTS

| | | | |
|---|---|---|---|
| 2012/0269436 A1* | 10/2012 | Mensink | G06K 9/00624 382/180 |
| 2019/0034798 A1 | 1/2019 | Yu et al. | |
| 2019/0080453 A1 | 3/2019 | Song et al. | |
| 2019/0102656 A1* | 4/2019 | Kwant | G06K 9/623 |

FOREIGN PATENT DOCUMENTS

CN  109685135  4/2019

* cited by examiner

*Primary Examiner* — Ross Varndell
(74) *Attorney, Agent, or Firm* — G.E. Ehrlich (1995) Ltd.

(57) ABSTRACT

A system for generating a set of digital image features, comprising at least one hardware processor adapted for: producing a plurality of input groups of features, each produced by extracting a plurality of features from one of a plurality of digital images; computing an output group of features by inputting the plurality of input groups of features into at least one prediction model trained to produce a model group of features in response to at least two groups of features, such that a model set of labels indicative of the model group of features is similar, according to at least one similarity test, to a target set of labels computed by applying at least one set operator to a plurality of input sets of labels each indicative of one of the at least two groups of features; and providing the output group of features to at least one other processor.

18 Claims, 8 Drawing Sheets

METHOD AND SYSTEM FOR PRODUCING DIGITAL IMAGE FEATURES

BACKGROUND

The present invention, in some embodiments thereof, relates to data synthesis and, more specifically, but not exclusively, to synthesis of data related to digital images.

There is an increasing need for data augmentation and data synthesis, for example when accruing sufficient data for a task is difficult to achieve. For example, there is an increasing need to augment existing training data or produce synthetic training data in order to provide sufficient data to accurately train a deep machine learning model, such as a deep neural network with a large amount of internal layers. One field where training data is needed is computer vision, where a model is trained to identify, or extract, or both, semantic content of interest in a digital image using large quantities of labeled data tailored to a given task. In computer vision the trained model is expected to encode within the model all semantic content of interest, including one or more object categories present in a digital image, one or more visual attributes of an object and location of an object and of a visual attribute. However, it may be the case that only a small amount of labeled samples, depicting an object or a feature, are available.

As used herein, a feature is a portion of digital data which is relevant for solving a computational task related to an application. Specifically in the domain of computer vision, as used herein a feature is a portion of a digital image or a shape detectable in the digital image which is relevant for solving the computational, for example classification of a digital image according to one or more objects detected in the image or generation of a digital image. In computer vision, a feature may be a visual attribute or a location of an object present in an image. Some examples of a low level feature are an edge, i.e. points in a digital image where image brightness changes sharply, and a blob, i.e. an area in the digital image where some image properties are constant or approximately constant. Some examples of a higher level feature are a shape, for example a polygon or a circle, a body part, for example a nose or a tail, and an object, for example a person, an animal, a bird, a dog, a car, and a chair. In other domains, for example text processing, a feature may be a part of speech, such as a noun or a verb. In yet other domains, for example speech synthesis and speech recognition, a feature may be a phoneme.

The term few-shot learning refers to the practice of training a learning model with a very small amount of labeled training data, contrary to the normal practice of using a large amount of data. In few shot learning, feature spaces for training a model are either transferred from other spaces or generated on the fly, augmenting a relatively small existing set of training data with synthetic data. One possible way of augmenting the existing set of training data is generating new examples from the existing set of training data.

Some areas of computer vision require training a classification model to classify a digital image according to whether a class of object is present in the digital image. There is a need to train a classification model to identify one or more objects in an image when only few sample images are available. For example, to train a model for classifying birds there may be few samples, if any at all, of a rare bird.

SUMMARY

It is an object of the present invention to provide a system and a method for producing a group of digital image features.

The foregoing and other objects are achieved by the features of the independent claims. Further implementation forms are apparent from the dependent claims, the description and the figures.

According to a first aspect of the invention, a system for generating a set of digital image features comprises at least one hardware processor adapted for: producing a plurality of input groups of features, each produced by extracting a plurality of features from one of a plurality of digital images; computing an output group of features by inputting the plurality of input groups of features into at least one prediction model trained to produce a model group of features in response to at least two groups of features, such that a model set of labels indicative of the model group of features is similar, according to at least one similarity test, to a target set of labels computed by applying at least one set operator to a plurality of input sets of labels each indicative of one of the at least two groups of features; and providing the output group of features to at least one other hardware processor for the purpose of performing at least one feature related task.

According to a second aspect of the invention, a method for generating a set of digital image features comprises: producing a plurality of input groups of features, each produced by extracting a plurality of features from one of a plurality of digital images; computing an output group of features by inputting the plurality of input groups of features into at least one prediction model trained to produce a model group of features in response to at least two groups of features, such that a model set of labels indicative of the model group of features is similar, according to at least one similarity test, to a target set of labels computed by applying at least one set operator to a plurality of input sets of labels each indicative of one of the at least two groups of features; and providing the output group of features to at least one hardware processor for the purpose of performing at least one feature related task.

According to a third aspect of the invention, a system for training a plurality of set-operation prediction models, comprising at least one hardware processor adapted to: in each of a plurality of iterations: generating a plurality of groups of training features, each group of training features extracted from one of a plurality of training images, each training image having an input set of labels indicative of a plurality of training features of the respective training image; providing the plurality of groups of training features to each of a plurality of set-operator prediction models, each set-operator prediction model associated with one of a plurality of set operators and adapted to produce one of a plurality of model output groups of features corresponding to a model target set of labels computed by applying the respective set operator to a plurality of input sets of labels of the plurality of training images; providing the plurality of model output groups of features to at least one multi-label classification model to produce a plurality of output sets of labels, each output set of labels associated with one of the plurality of model output groups of features and having a score set comprising a plurality of label-scores, each label-score indicative of a confidence of identifying by the at least one multi-label classification model one label of the output set of labels in respective model output group of features; computing a loss score using the plurality of output sets of labels and the plurality of input sets of labels; and modifying at least one model value of at least one of the plurality of set-operator prediction models to reduce another loss score computed in another iteration of the plurality of iterations.

According to a fourth aspect of the invention, a system for training a multi-label classification model comprises at least one hardware processor adapter for: generating a plurality of feature sets, generating each feature set of the plurality of feature sets comprising: producing a plurality of input groups of features, each produced by extracting a plurality of features from one of a plurality of digital images; computing an output group of features by inputting the plurality of input groups of features into at least one prediction model trained to produce a model group of features in response to at least two groups of features, where the at least one prediction model is trained using a loss score, where computing the loss score comprises: computing a target set of labels by applying at least one set operator to a plurality of input sets of labels, each indicative of a plurality of training features of one of a plurality of training images; computing a model set of labels by providing the model group of features to at least one classification model; and computing a difference between the target set of labels and the model set of labels; and providing the plurality of feature sets to at least one multi-label classification model for the purpose of training the at least one multi-label classification model.

With reference to the first and second aspects, in a first possible implementation of the first and second aspects of the present invention the at least one prediction model is trained using a loss score, where computing the loss score comprises: computing the target set of labels by applying the at least one set operator to the plurality of input sets of labels; computing the model set of labels by providing the model group of features to at least one classification model; and computing a difference between the target set of labels and the model set of labels. Computing a difference between the target set of labels and the model set of labels and using the difference in a loss score used to train the one or more prediction models forces the one or more prediction models to learn to synthesize the new group of features corresponding to the target set of labels only by observing the two or more groups of features, without being explicitly provided with the respective labels of the two or more groups of features, and thus increases accuracy of an output of the one or more prediction models when the input digital images comprise one or more unknown features, not explicitly labeled.

With reference to the first and second aspects, in a second possible implementation of the first and second aspects of the present invention at least one of the at least one set operator is selected from a group of set operators consisting of: union, intersection, and subtraction. Optionally, the at least one prediction model comprises a first prediction model and a second prediction model. Optionally, the first prediction model is associated with a first set operator applied to another plurality of input sets of labels, each indicative of a plurality of features of one of the plurality of digital images. Optionally, the second prediction model is associated with a second set operator applied to the other plurality of input sets of labels. Optionally computing the output group of features comprises: computing a first intermediate group of features by inputting into the first prediction model a first plurality of groups of features; and computing a second intermediate group of features by inputting into the second prediction model a second plurality of groups of features. Optionally, at least some of the plurality of input groups of features are included in at least one of: the first plurality of groups of features, and the second plurality of groups of features. Optionally, the second plurality of groups of features comprises the first intermediate group of features. Optionally, the output group of features is the second intermediate group of features. Optionally, the first plurality of groups of features comprises at least some of the plurality of input groups of features. Optionally, the second plurality of groups of features further comprises at least some of the plurality of input groups of features. Connecting the at least one prediction model in a cascade where input to at least some of the at least one prediction model comprises at least some of the plurality of groups of features, and other input to at least some other of the at least one prediction model comprises at least some intermediate groups of features allows creating complex combinations of features of the plurality of groups of features, increasing usability of an output of the one or more prediction models.

With reference to the first and second aspects, in a third possible implementation of the first and second aspects of the present invention access to the plurality of digital images is by receiving the plurality of digital images from at least one other hardware processor. Optionally, access to the plurality of digital images is by retrieving the plurality of digital images from at least one non-volatile digital storage, connected to the at least one hardware processor.

With reference to the first and second aspects, in a fourth possible implementation of the first and second aspects of the present invention at least one of the at least one prediction model is a neural network.

With reference to the first and second aspects, or the first implementation of the first and second aspects, in a fifth possible implementation of the first and second aspects of the present invention training the at least one prediction model comprises: in each of a plurality of iterations: generating a plurality of groups of training features, each group of training features extracted from one of the plurality of training images; providing the plurality of groups of training features to each of a plurality of set-operator prediction models, each set-operator prediction model associated with one of a plurality of set operators and adapted to produce one of a plurality of model output groups of features corresponding to a model target set of labels computed by applying the respective set operator to the plurality of input sets of labels; providing the plurality of model output groups of features to at least one multi-label classification model to produce a plurality of output sets of labels, each output set of labels associated with one of the plurality of model output groups of features and having a score set comprising a plurality of label-scores, each label-score indicative of a confidence of identifying by the at least one multi-label classification model one label of the output set of labels in respective model output group of features; computing a loss score using the plurality of output sets of labels and the plurality of input sets of labels; and modifying at least one model value of at least one of the plurality of set-operator prediction models to reduce another loss score computed in another iteration of the plurality of iterations. Optionally, computing the loss score comprises computing for each of the plurality of set-operator prediction models a model loss score, using the respective score set of the respective output set of labels, where the model loss score is indicative of the difference between the respective model target set of labels and a respective model output set of labels, predicted by at least one classification model for the model output group of features. Training the plurality of set-operator prediction models using a loss score indicative of one or more differences between a model target set of labels of one of the plurality of set-operator prediction models and a respective model output set of labels, predicted by at least one classification model for the respective model output group of features increases accuracy of an output of the set-operator prediction model. Optionally, providing the plurality of groups of training features to each of the plurality of set-operator prediction models comprises providing to at least one set-operator prediction model of the plurality of set-operator prediction models a first group of training features of the plurality of groups of training features as a first input and a second group of training features of the plurality of groups of training features as a second input, to produce a first model group of features. Optionally, computing the loss score further comprises: providing to the at least one set-operation prediction model the first training group of features as the second input and the second group of training features as the first input, to produce a second model group of features; applying a mean square error method to the first model group of features and the second model group of features to produce a symmetric reconstruction error score; and computing the loss score further using the symmetric reconstruction error score. Training the plurality of set-operator prediction models using a loss score indicative of one or more differences between the first model group of features and the second model group of features increases accuracy of an output of the set-operator prediction model. Optionally, the plurality of set-operator prediction models comprises an intersection model of the plurality of set-operator prediction models such that a target intersection group of features of the intersection model is computed by applying an intersection operator to at least two first groups of features provided to the intersection model. Optionally, the plurality of set-operator prediction models comprises a subtraction model of the plurality of set-operator prediction models, such that a target subtraction group of features of the subtraction model is computed by applying a subtraction operator to at least two second groups of features provided to the subtraction model. Optionally, the plurality of set-operator prediction models comprises a union model of the plurality of set-operator prediction models, such that a target union group of features of the third model is computed by applying a union operator to at least two third groups of features provided to the union model. Optionally, computing the loss score further comprises: providing a first group of features and a second group of features, both of the plurality of groups of training features, to the intersection model to produce an intersection group of features; providing the first group of features and the second group of features to the subtraction model to produce a subtraction group of features; providing the subtraction group of features and the intersection group of features to the union model, to produce a union group of features; applying a mean square error method to the union group of features and the first group of features to produce a mode-collapse reconstruction error score; and computing the loss score further using the mode-collapse reconstruction error score. Optionally, computing the loss score further comprises: providing the second group of features and the first group of features to the subtraction model to produce another subtraction group of features; providing the other subtraction group of features and the intersection group of features to the union model to produce a another union group of features; applying the mean square error method to the other union group of features and the second group of features to produce another mode-collapse reconstruction error score; and computing the loss score further using the other mode-collapse reconstruction error score. Training the plurality of set-operator prediction models using one or more mode-collapse reconstruction error scores, each indicative of a difference between an original group of features and a reconstructed group of features computed by applying a union operator to an intersection of the original group of features and another group of features and a subtraction of the other group of features from the original group of features reduces a risk of model collapse of one of the plurality of set-operator prediction models, where the set-operator prediction model produces the same output in response to different input, thus increasing accuracy of an output of the set-operator prediction model. Optionally, the plurality of training images comprises a plurality of training image pairs each comprising two of the plurality of training images. Optionally, the plurality of groups of training features comprises two groups of training features, each extracted from one of the two training images of one of the plurality of training image pairs. Training the plurality of training images using training image pairs, increases accuracy of an output of each of the set-operator prediction models. Optionally, at least one of the plurality of set-operator prediction models is another neural network.

With reference to the first and second aspects, or the first and fifth implementation of the first and second aspects, in a sixth possible implementation of the first and second aspects of the present invention the system further comprises training the at least one multi-label classification model comprising: in at least some of the plurality of iterations: computing a multi-label classification loss score using the plurality of output sets of labels and the plurality of input sets of labels; and modifying at least one classification model value of the at least one multi-label classification model to reduce another multi-label classification loss score computed in another iteration of the plurality of iterations. Optionally, computing the multi-label classification loss score comprises, for each of some of the plurality of training images: computing a set of classification scores by providing the training image to the at least one multi-label classification model; and computing a binary cross-entropy loss value for the set of classification scores and the respective input set of labels. Optionally, the at least one multi-label classification model is a second other neural network.

With reference to the first and second aspects, in a seventh possible implementation of the first and second aspects of the present invention at least one of the at least one feature related task is selected from a group of tasks consisting of: generating a digital image, retrieving a digital image, and training at least one other classification model.

With reference to the third aspect, in a first possible implementation of the third aspect of the present invention computing the loss score comprises for at least one model of the plurality of set-operation prediction models: computing a target set of labels by applying at least one set operator associated with the at least one model to the plurality of input sets of labels; and computing a difference between the target set of labels and at least one output set of labels of the respective at least one model.

With reference to the fourth aspect, in a first possible implementation of the fourth aspect of the present invention the at least one multi-label classification model is a neural network. Optionally, the at least one prediction model is another neural network.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
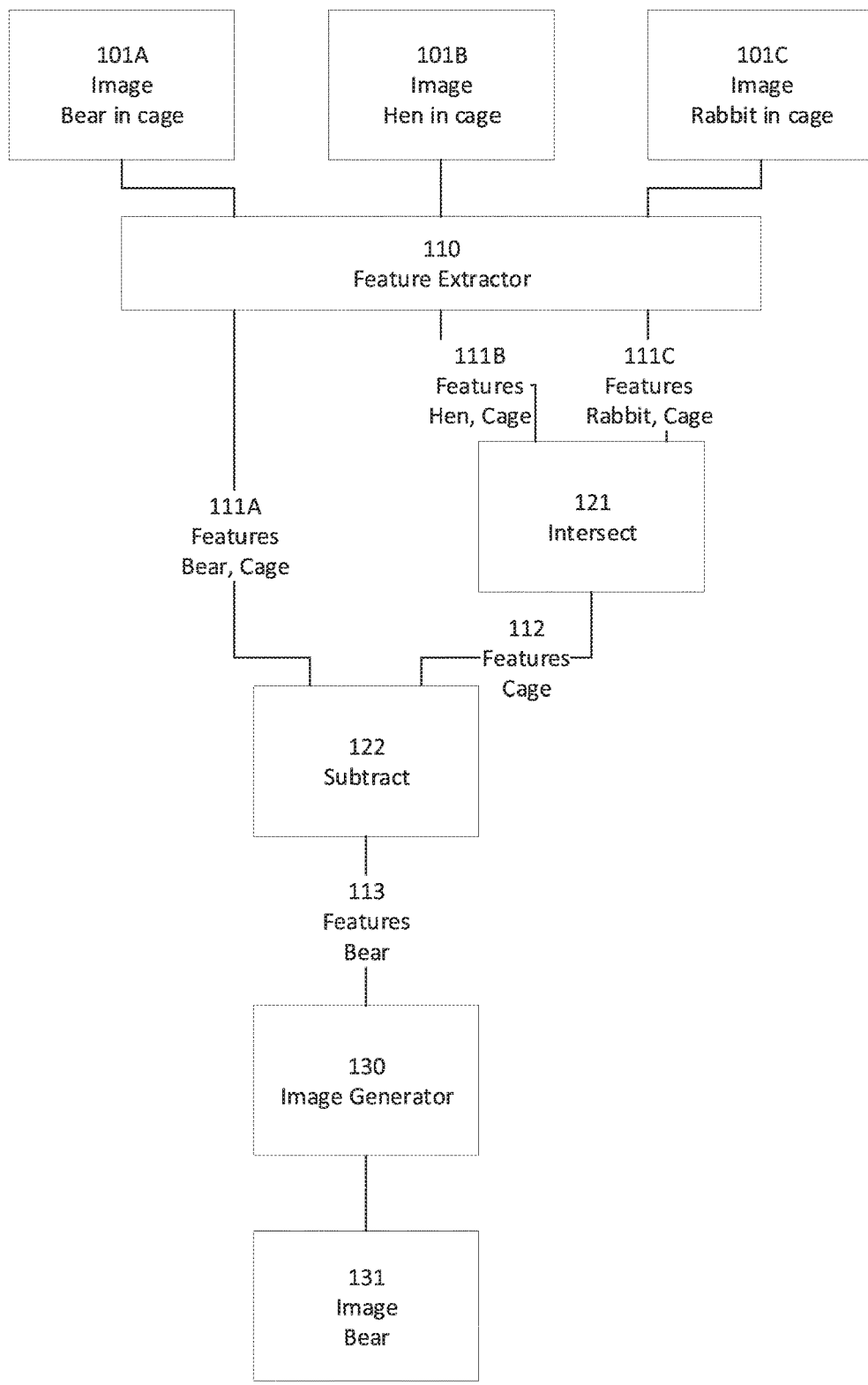
FIG. 1 is a schematic illustration of an exemplary manipulation of features, according to some embodiments of the present invention.

The present invention, in some embodiments thereof, relates to data synthesis and, more specifically, but not exclusively, to synthesis of data related to digital images.

A single label image classification model is a model trained to categorize an image (or a group of features extracted from an image) into precisely one of a plurality of categories. There exist solutions for producing synthetic data for training a single label image classification network, where each generated training image used to train the single label classification network has a single object, and thus a single category, or class, label.

A multi-label image classification network categorizes an image into more than one category of the plurality of categories. To train such a multi-label image classification network there is a need for images with a variety of combinations of possible objects. As suitable images with the required combinations are not always available, there is a need to produce synthetic data describing an image with more than one object, and thus having more than one class label.

Existing solutions for producing multi-label synthetic images include geometric deformations of existing images, and use of Generative Adversarial Networks (GANs). Other solutions require additional semantic information, beyond what is available in the existing set of training data.

Henceforth, the terms "group of features" and "set of features" are used interchangeably. In addition, the term "vector of features" is used to mean a set (or group) of features having an identified order. Common implementations of computer vision using groups of features use vectors of features, however the present invention is not limited to the use of vectors of features and may be applied to one or more groups of features matched in a matching method other than by order.

There exist methods for extracting a group of image features from a digital image and other methods for synthesizing a synthetic digital image from a group of image features. The present invention, in some embodiments thereof, focuses on generating a new training data sample having a label set corresponding to a combination of label sets of one or more data samples of the existing training data, without requiring additional semantic information describing the existing training data. To do so, the present invention proposes, in some embodiments thereof, training one or more prediction models to combine by example, i.e. without explicitly specifying which features, features extracted from two or more input digital images to produce a new group of features for performing a feature related task. Some examples of a feature related task are training an image classification model, retrieving an image according to the new group of features, and generating a new digital image according to the new group of features.

To train a model for use in an identified domain, a digital image used to train the model is typically annotated according to semantics of the identified domain. To produce a useful image for training the model, there is a need to combine features with semantic relevance to the identified domain while excluding other features with no semantic relevance to the identified domain. For example, to train a model for identifying animals an image annotation vocabulary may comprise types of animals, but other features such as vegetation or a cage may not be annotated. A model trained with only images captured in a zoo, where the animals are caged, may fail to identify a free animal in an image captured in the wild. In this example there is a need to produce one or more images comprising one or more animals without a cage. To do so, in this example there is a need to identify a common unnamed feature—a cage—in some images, and remove that feature from one or more images (for example, remove a cage from an image of a caged bear to produce an image of a free bear). There exist methods for learning correlations within one or more images, however such methods typically cannot be exploited for a new task, having unseen categories (classifications).

The present invention, in some embodiments thereof, proposes producing a new multi-label group of features, without explicitly specifying which features to include in the new multi-label group of features, by manipulating two or more groups of features, for example two or more groups of features corresponding with two or more of an existing plurality of digital images. According to some embodiments of the present invention, the two or more groups of features are manipulated by one or more prediction models, such that applying one or more classification models to a new multi-label group of features produced by the one or more prediction models in response to the two or more groups of features produces an output set of labels that is similar, according to one or more similarity tests, to a target set of labels that can be computed by applying one or more set operators to other sets of labels associated with the two or more groups of features. An example of a similarity test is comparing a difference between the output set of labels and the target set of labels to one or more threshold difference values. For example, when the difference between the output set of labels and target set of labels is less than one or more threshold difference values the output set of labels is considered similar to the target set of labels. Optionally, a similarity test comprises comparing an absolute value of a difference to one or more threshold difference values.

According to some embodiments of the present invention the one or more prediction models are trained using a plurality of groups of training features each extracted from one of a plurality of training images. Optionally, each of the plurality of training images has an input set of labels indicative of a plurality of training features of the respective training image; however the input set of labels is optionally not input into the one or more prediction models while training the one or more prediction models. Instead, according to some embodiments of the present invention, the one or more prediction models are trained using a loss score computed using a target set of labels computed by applying one or more set operators, such as union, intersection, and set-difference (subtraction), to one or more input sets of labels. In such embodiments, the loss score is a label-set loss score indicative of a difference between the target set of labels and a model set of labels, where the model set of labels is computed by providing a model group of features, produced by the one or more prediction model in response to two or more groups of feature, to at least one classification model. Optionally the least one classification model is a multi-label classification model. Using a new group of features combining features from two or more groups of features instead of combining visual objects from the two or more existing digital images increases accuracy of an output of the one or more prediction models, as training using the new group of features allows the one or more prediction models to learn an adaptive representation that highlights factors important for recognition of an object and classification of an image while ignoring changes in unimportant factors that are unimportant for classification. For example, the adaptive representation may be learned to be robust when an object is transformed by for example, but not limited to, one or more transformations including occlusion, translation, rotation, a general local deformation, a pose change, a change in texture, or lighting variation. According to some embodiments of the present invention, in at least some of the plurality of iterations at least one model value of the one or more prediction models is modified to reduce another loss score computed in another iteration of the plurality of iterations. Using a loss score which is indicative of a difference between the target set of labels and the model set of labels to train the one or more prediction models forces the one or more prediction models to learn to synthesize the new group of features corresponding to the target set of labels only by observing the two or more groups of features, without being explicitly provided with the respective labels of the two or more groups of features, and thus increases accuracy of an output of the one or more prediction models when the input digital images comprise one or more unknown features, not explicitly labeled. Optionally the loss score is a numerical value. Optionally the loss score comprises a plurality of numerical values, for example a vector of numerical values.

Optionally, each of the one or more prediction models is associated with one set operator applied to the one or more input sets of labels. For example, one of the one or more predictions models may be associated with an intersection operator applied to two of the input sets of labels. Optionally, another of the one or more prediction models is associated with a subtraction operator. According to some embodiments of the present invention, to produce the output group of features the one or more prediction models are connected in a cascade, such that output of one prediction model of the one or more prediction models is an input to another prediction model of the one or more prediction models. Such a cascade connection allows creating complex combinations of features of the two or more groups of features, increasing usability of an output of the one or more prediction models.

In addition, according to some embodiments of the present invention, the one or more prediction models are each selected from a plurality of set-operator prediction models trained simultaneously using a plurality of training images. Optionally, each of the plurality of set-operator prediction models is associated with one of a plurality of set operators. Optionally, each of the plurality of training images has one of a plurality of input sets of labels. Optionally, each of the plurality of set-operator prediction models is adapted to produce one of a plurality of model output groups of features corresponding to a model target set of labels computed by applying the respective set operator to the plurality of input sets of labels. Optionally, a plurality of groups of training features are each extracted from one of the plurality of training images. Optionally, the plurality of set-operator prediction models is trained in a plurality of iterations. Optionally, in each iteration of the plurality of iterations, the plurality of input sets of labels has two input sets of labels, corresponding with two of the plurality of training images. Using one or more prediction models selected from a plurality of set-operator prediction models reduces cost and time of deployment of a system for generating the new group of features and increases accuracy of an output of the one or more prediction models. Training the plurality of set-operator prediction models simultaneously increases accuracy of an output of each of the plurality of set-operator prediction models. Training each of the plurality of set-operator prediction models using two input sets of labels increases accuracy of an output of one or more prediction models by allowing complex combinations of set-operator prediction models associated with binary set operations.

In addition, the present invention proposes, according to some embodiments thereof, training at least one multi-label classification model. In such embodiments, in at least some of the plurality of iterations, the present invention proposes computing a multi-label classification loss score using a plurality of output sets of labels and the plurality of input sets of labels and modifying at least one classification model value of the at least one multi-label classification model to reduce another multi-label classification loss score computed in another iteration of the plurality of iterations. Optionally each of the plurality of output sets of labels is produced by the at least one multi-classification model in response to one of the plurality of model output groups of features.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic illustration of an exemplary manipulation 100 of features, according to some embodiments of the present invention. In such embodiments, feature extractor 110 produces a plurality of input groups comprising group of features 111A, group of features 111B and group of features 111C, each extracted from one of a plurality of digital images comprising image 101A, image 101B, and image 101C respectively. In one example, image 101A depicts a bear in a cage, image 101B depicts a hen in a cage and image 101C depicts a rabbit in a cage. In this example, to produce an image of a free bear, that is a bear not in a cage, there is a need to produce an image depicting a group of objects corresponding to removing from objects identified in image 101A (a bear and a cage) an object (cage) common to image 101B and 101C. This example shows how an image of a bear may be created without "cage" being part of a vocabulary describing a required image. In this example, group of features 111A, extracted from image 101A, corresponds with a first group of objects comprising a bear and a cage. Similarly, group of features 111B corresponds with a second group of objects comprising a hen and a cage, and group of features 111C corresponds with a third group of objects corresponding with a rabbit and a cage. A first prediction model 121 may compute in response to group of features 111B and group of features 111C model group of features 112. Optionally, model group of features 112 corresponds with an intersection of the second group of objects and the third group of objects, in this example the intersection being a cage. In this example, the cage is implied by model group of features 112, not explicitly identified in model group of features 112. A second prediction model 122 may compute in response to group of features 111A and model group of features 112 another model group of features 113. Optionally, other model group of features 113 corresponds with a set-difference between the first group of objects and the intersection, i.e. a subtraction of the intersection from the first group of objects. In this example, the subtraction is a bear. Again, in this example, the bear is implied by other model group of features 113 and not explicitly identified in other model group of features 113. Optionally, other model group of features 113 is provided to image generator 130, to produce synthetic image 131 depicting a bear. Thus, $$labels131 = labels101A - (labels101B \cap labels101C)$$

wherein labels131 depicts a first set of labels computed by applying at least one classification model to image 131, wherein labels101A depicts a second set of labels computed by applying the at least one classification model to image 101A, wherein labels101B depicts a third set of labels computed by applying the at least one classification model to image 101B, and wherein labels101C depicts a fourth set of labels computed by applying the at least one classification model to image 101C.

For brevity, the term "processor" is henceforth used to mean "at least one hardware processor" and the terms are used interchangeably. In addition, for brevity the term "network interface" is henceforth used to mean "at least one digital communication network interface".

Figure 2:
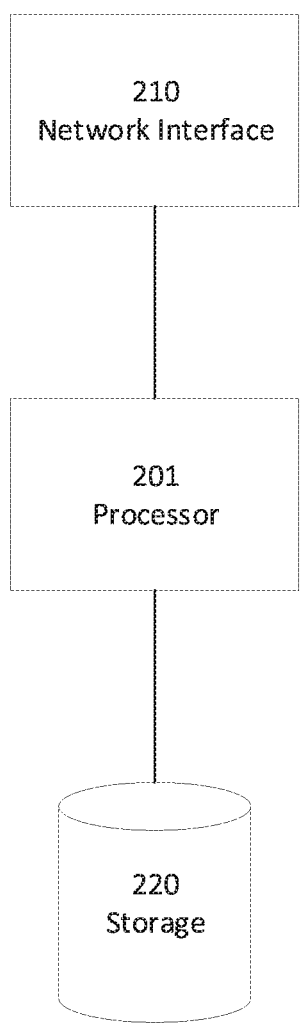
FIG. 2 is a schematic illustration of an exemplary system for producing a group of features, according to some embodiments of the present invention.

Reference is now made also to FIG. 2, showing a schematic illustration of an exemplary system 200 for producing a group of features, according to some embodiments of the present invention. In such embodiments, at least one hardware processor 201 is connected to network interface 210, optionally for the purpose of receiving a plurality of digital images. Optionally, processor 201 is connected to at least one other hardware processor (not show), optionally via network interface 210, for example for the purpose of performing one or more feature related tasks. An example of a feature related task is generating a synthetic digital image from an output group of features produced by processor 201. Optionally, network interface 210 is connected to one or more digital communication networks, for example a local area network (LAN) such as an Ethernet network or a wireless LAN. Other examples of a digital communication network are a Wide Area Network (WAN) such as the Internet. Optionally, processor 201 is connected to at least one non-volatile digital storage 220, for example for the purpose of retrieving the plurality of digital images. Some examples of a non-volatile digital storage are a hard disk drive, a network storage and a storage network. Optionally, processor 201 is connected to at least one non-volatile digital storage 220 via at least one digital communication network interface 210. Optionally, at least one hardware processor 201 stores the output group of features on at least one non-volatile digital storage 220.

In some embodiments of the present invention system 200 implements the following optional method.

Figure 3:
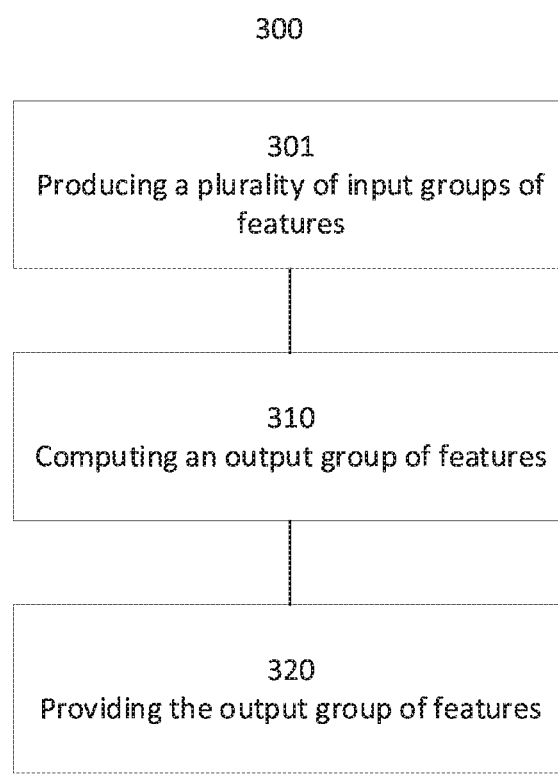
FIG. 3 is a flowchart schematically representing an optional flow of operations for producing a group of features, according to some embodiments of the present invention.

Reference is now also made to FIG. 3, showing a flowchart schematically representing an optional flow of operations 300 for producing a group of features, according to some embodiments of the present invention. In such embodiments, processor 201 produces in 301 a plurality of input groups of features, for example group of features 111A, group of features 111B and group of features 111C. Optionally, each input group of features of the plurality of groups of features is produced by extracting a plurality of features from one of a plurality of digital images, for example the plurality of digital images comprising image 101A, image 101B and image 101C. Optionally, processor 201 receives the plurality of digital images from at least one other hardware processor, optionally via network interface 210. Optionally, processor 201 retrieves the plurality of digital images from at least one non-volatile digital storage 220. In 310, processor 201 optionally computes an output group of features, for example other model group of features 113, by inputting the plurality of input groups of features into one or more prediction models trained to produce a model group of features in response to two or more groups of features.

Figure 4:
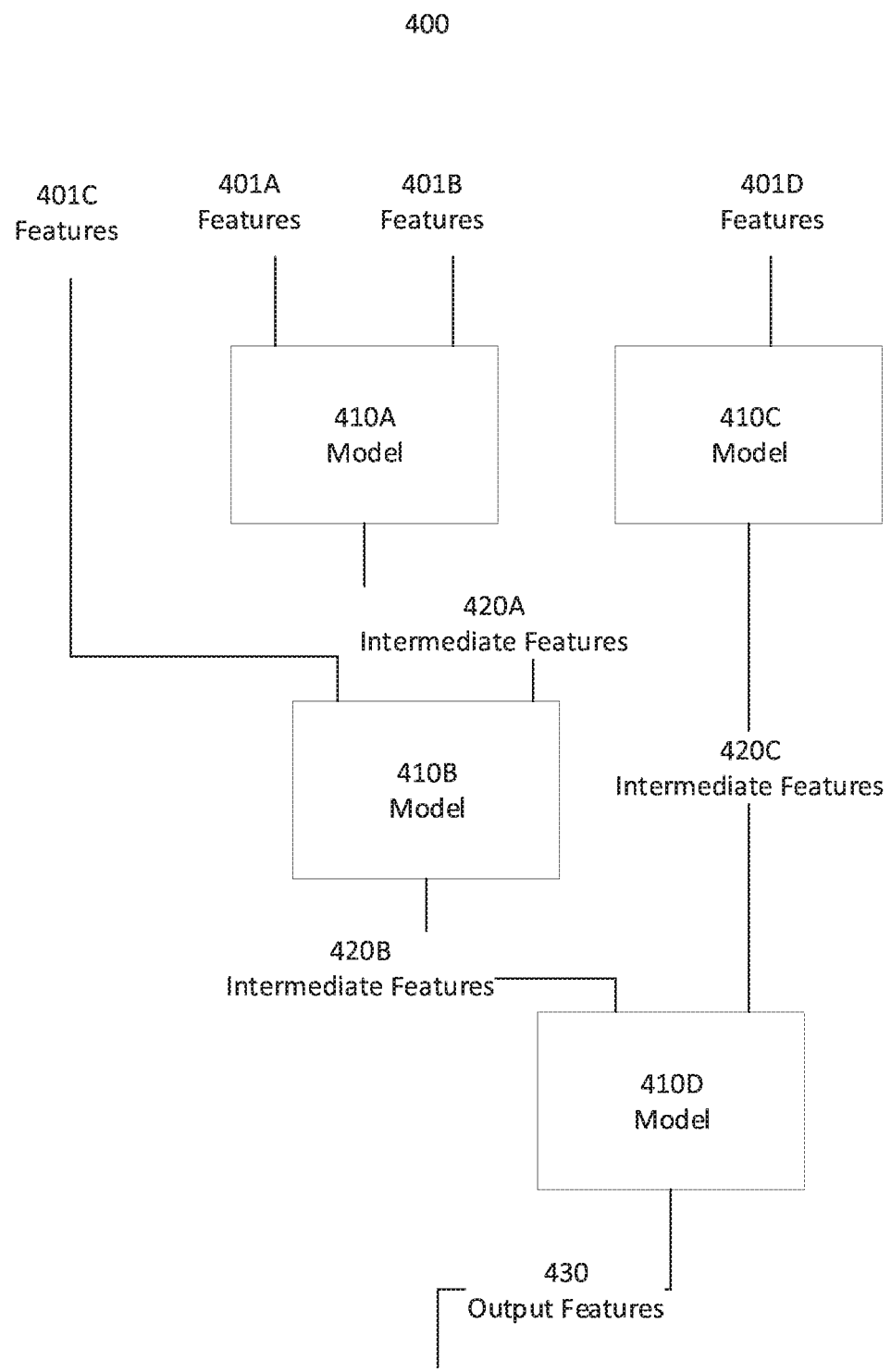
FIG. 4 is a schematic illustration of an exemplary plurality of prediction models, according to some embodiments of the present invention.

Reference is now made also to FIG. 4, showing a schematic illustration of an exemplary plurality of prediction models 400, according to some embodiments of the present invention. In such embodiments, the one or more prediction models are plurality of prediction models 400. Optionally, at least one of the one or more prediction models is a neural network. Optionally, the one or more prediction models comprise first prediction model 410A and second prediction model 410B. Optionally, first prediction model 410A is associated with a first set operator applied to a plurality of sets of labels. Optionally, the plurality of sets of labels is indicative of a plurality of features of one of the plurality of digital images. Some examples of a set operator are union, intersection and subtraction (set-difference). Optionally, second prediction model 410B is associated with a second set operator applied to the plurality of sets of labels. Optionally, in 310 processor 201 computes first intermediate group of features 420A by inputting into first prediction model 410A a first plurality of groups of features comprising group of features 401A and group of features 401A. Optionally, group of features 401A and group of features 401B are at least some of the plurality of input groups of features, for example group of features 111B and group of features 111C respectively. Optionally, processor 201 computes in 310 second intermediate group of features 420B by inputting into second prediction model 410B a second plurality of groups of features, optionally comprising second intermediate group of features 420A. Optionally, the second plurality of groups of features comprises at least some of the plurality of input groups of features, for example group of features 401C. Optionally, group of features 401C is group of features 111A. Optionally, processor 201 computes a third intermediate group of features 420C by inputting another group of features 401D of the plurality of input groups of features into third prediction model 410C, associated with another set operator applied to the plurality of sets of labels, where third prediction model 410C is one of the one or more prediction models. Optionally, processor 201 produces fourth intermediate group of features 430 by inputting third group of features 420C into fourth prediction model 410D, where fourth prediction model 410D is one of the one or more prediction models. Optionally, the output group of features is fourth intermediate group of features 430. Optionally, the output group of features is second intermediate group of features 420B. In other embodiments, the output group of features is first intermediate group of features 420A or third intermediate group of features 420C. Optionally, the first plurality of groups of features comprises two groups of features. Optionally, the first plurality of groups of features comprises more than two groups of features. Optionally the second plurality of groups of features comprises two other groups of features. Optionally, the second plurality of features comprises more than two other groups of features.

Reference is now made again to FIG. 3. In 320, processor 201 optionally provides the output group of features to at least one other hardware processor for the purpose of performing at least one feature related task. Optionally, the at least one feature related task is training at least one multi-label classification model. Optionally, the at least one feature related task is generating at least one new digital image, optionally according to the output group of features, for example image 131. Optionally, the at least one feature related task is retrieving at least one digital image, optionally according to the output group of features, optionally from at least one other non-volatile digital storage.

According to some embodiments of the present invention, at least one of the one or more prediction models is trained to produce a model group of features such that a model set of labels computed by at least one classification model in response to the model group of features is similar, according to one or more similarity tests, to a target set of labels. Optionally, the at least one prediction model is trained using a loss score indicative of a difference between the target set of labels and the model set of labels computed by providing an output of the at least one prediction model to the at least one classification model.

Figure 5:
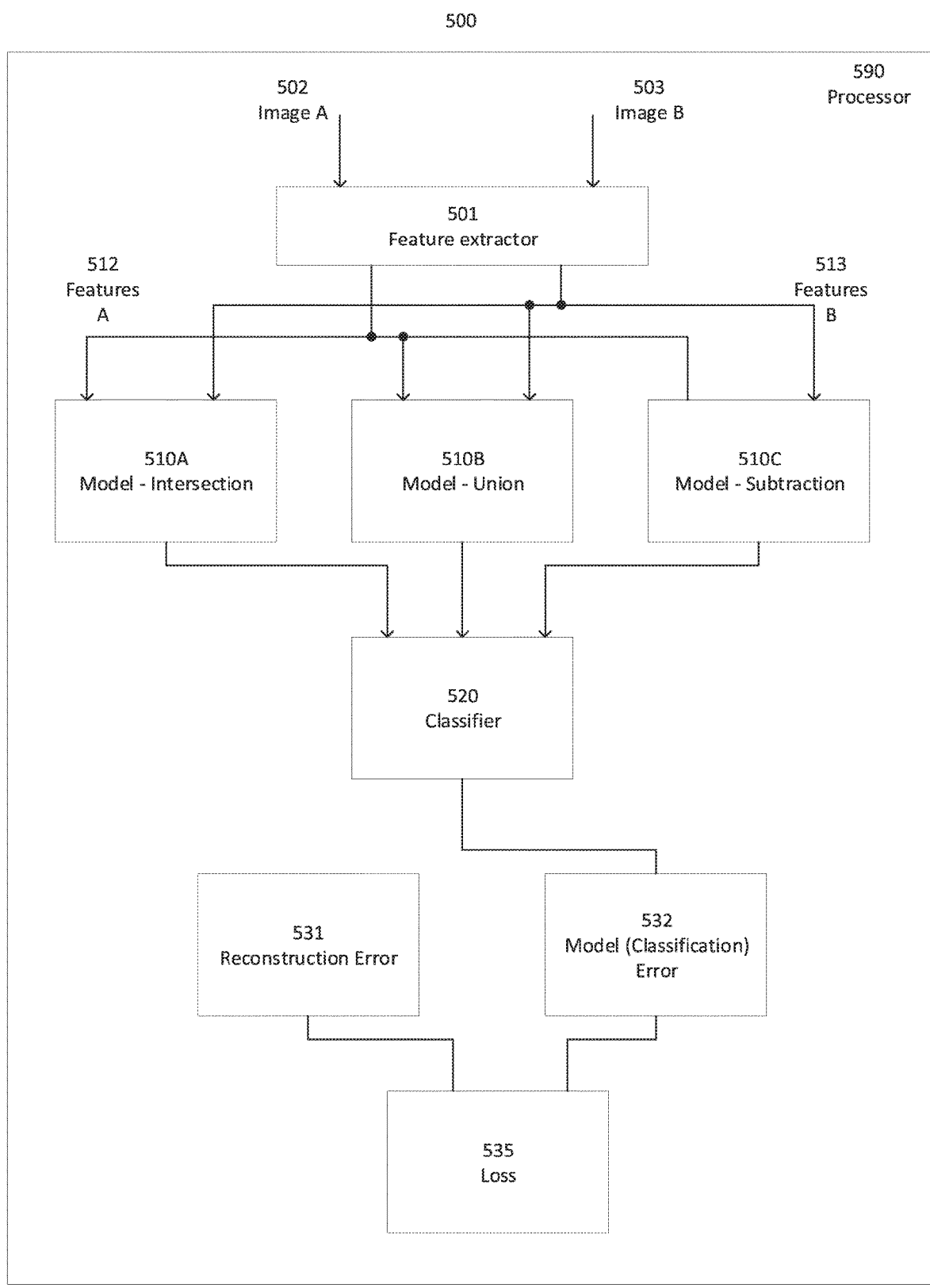
FIG. 5 is a schematic block diagram of part of an exemplary training system, according to some embodiments of the present invention.

Reference is now made also to FIG. 5, showing a schematic block diagram of part of an exemplary training system 500, according to some embodiments of the present invention. In such embodiments, at least one hardware processor 590 is adapted to execute at least one feature extractor 501. Optionally, at least one feature extractor 501 is another neural network. Some examples of a neural network are a residual neural network (ResNet) and a GoogLeNet Inception network. Optionally, processor 590 executes at least one feature extractor 501 for the purpose of extracting a plurality of groups of training features, for example comprising group of training features 512 and group of training features 513, each extracted from one of a plurality of training images, for example comprising training image 502 and training image 503 respectively. Optionally, processor 590 executes a plurality of set-operator prediction models, for example comprising set-operator prediction model 510A, set-operator prediction model 510B and set-operator prediction model 510C. Optionally, each set-operator prediction model of the plurality of set-operator prediction models is associated with one of a plurality of set operators. Optionally, processor 590 provides the plurality of groups of training features to the plurality of set-operator prediction models. Optionally, at least one of the set-operator prediction models is yet another neural network. Optionally, processor 590 executes one or more multi-label classification model 520. Optionally, processor 590 provides one or more outputs of the plurality of set-operator prediction models to one or more multi-label classification model 520. Optionally, one or more multi-label classification model is an additional neural network. Optionally, processor 590 executes one or more software objects for the purpose of computing a loss score, for example software object 531, software object 532 and software object 535. Some examples of a software object are an executable computer program, a dynamically loaded library, and a script.

In some embodiments of the present invention, system 500 executes the following optional method to train the plurality of set-operator prediction models.

Figure 6:
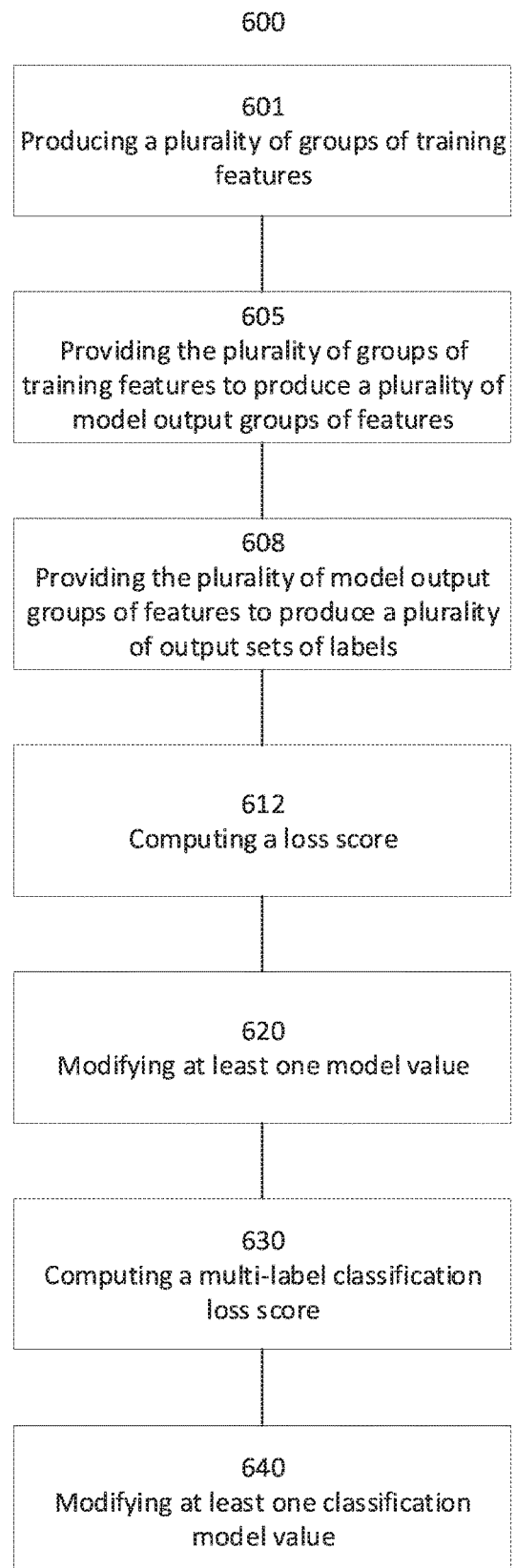
FIG. 6 is a flowchart schematically representing an optional flow of operations for training, according to some embodiments of the present invention.

Reference is now made to FIG. 6, showing a flowchart schematically representing an optional flow of operations 600 for training, according to some embodiments of the present invention. In such embodiments, in 601 processor 590 generates a plurality of groups of training features, each group of training features extracted from one of a plurality of training images, for example using at least one feature extractor 501. Optionally, the plurality of training images comprises a plurality of training image pairs, each comprising two of the plurality of training images, for example training image 502 and training image 503. Optionally, the plurality of groups of training features comprises two groups of training features, each extracted from one of the two training images of one of the plurality of training image pairs, for example group of training features 512 and group of training features 513, optionally extracted by at least one feature extractor 501 from training image 502 and training image 503 respectively. In 605, processor 590 provides the plurality of groups of training features to each of the plurality of set-operator prediction models. Optionally, each set-operator prediction model is adapted to produce one of a plurality of model output groups of features corresponding to a model target set of labels computed by applying the respective set operator to a plurality of input sets of labels. Optionally, each of the plurality of input sets of labels is indicative of a plurality of training features of one of the plurality of training images. Reference is made again to FIG. 5. In some embodiments, set-operator prediction model 510A is associated with set operator intersection and is adapted to produce a model output group of features corresponding to an intersection between a first input set of labels indicative of group of features 512 and a second input set of labels indicative of group of features 513. Similarly, set-operator prediction model 510B may be associated with set operator union and may be adapted to produce a second model output group of features corresponding to a union between the first input set of labels and the second input set of labels. Similarly, set-operator prediction model 510C may be associated with set operator subtraction and may be adapted to produce a third model output group of features corresponding to subtracting the second input set of labels from the first input set of labels.

Reference is now made again to FIG. 6. In 608, processor 590 optionally provides the plurality of model output groups of features to one or more multi-label classification model 520 to produce a plurality of output sets of labels. Optionally, each output set of labels of the plurality of output sets of labels is associated with one of the plurality of model output groups of features, and optionally has a score set comprising a plurality of label-scores, each label-score indicative of a confidence of identifying by one or more multi-label classification model 520 one label of the output set of labels in respective model output group of features. Optionally, each of the plurality of label-scores is a binary value selected from the set of [0, 1]. Optionally a label-score having a value of 1 is indicative of an expected feature, i.e. a feature expected to be identified in the respective model output group of features. Optionally, in 612 processor 590 computes a loss score using the plurality of output sets of labels and the plurality of input sets of labels.

Figure 7:
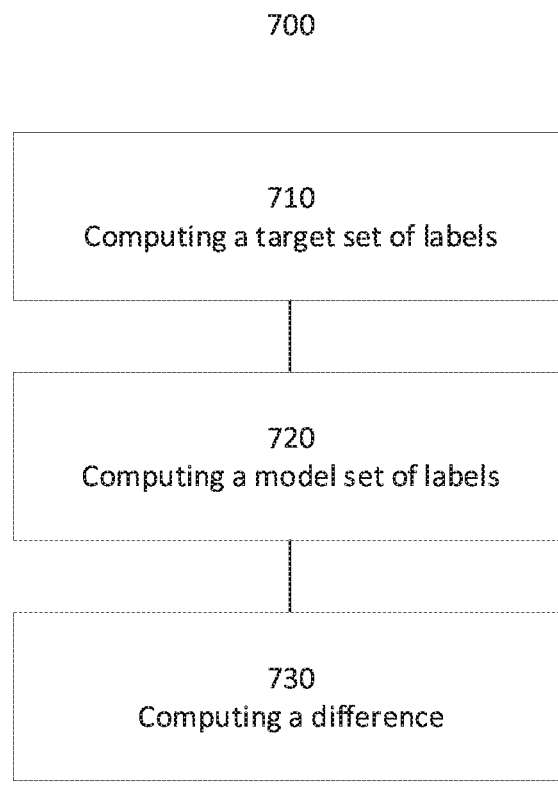
FIG. 7 is a flowchart schematically representing an optional flow of operations for computing a loss score, according to some embodiments of the present invention.

Reference is now made to FIG. 7, showing a flowchart schematically representing an optional flow of operations 700 for computing a loss score, according to some embodiments of the present invention. In such embodiments, processor 590 computes in 710 for at least one of the plurality of set-operator prediction models a target set of features by applying the set operator of the at least one set-operator prediction model to the plurality of input sets of labels. Optionally, for each of the plurality of set-operator prediction models the respective target set of labels is the model target set of labels of the respective model. In 720, processor 590 optionally computes for the at least one set-operator prediction model a model set of labels by providing the at least one set operator prediction model's model group of features to one or more multi-label classification model 520. Optionally, a plurality of model set of labels each computed for one of the plurality of set-operator prediction models is the plurality output sets of labels computed in 608. In 730, processor 590 optionally computes for the at least one set-operator prediction model a difference between the model target set of labels of the at least one set-operator prediction model and the model set of labels of the at least one set-operator prediction model. Optionally, processor 590 computes another difference between the plurality of model sets of labels and the plurality of model target sets of labels. To compute the other difference, system 500 optionally implements the following method.

Figure 8:
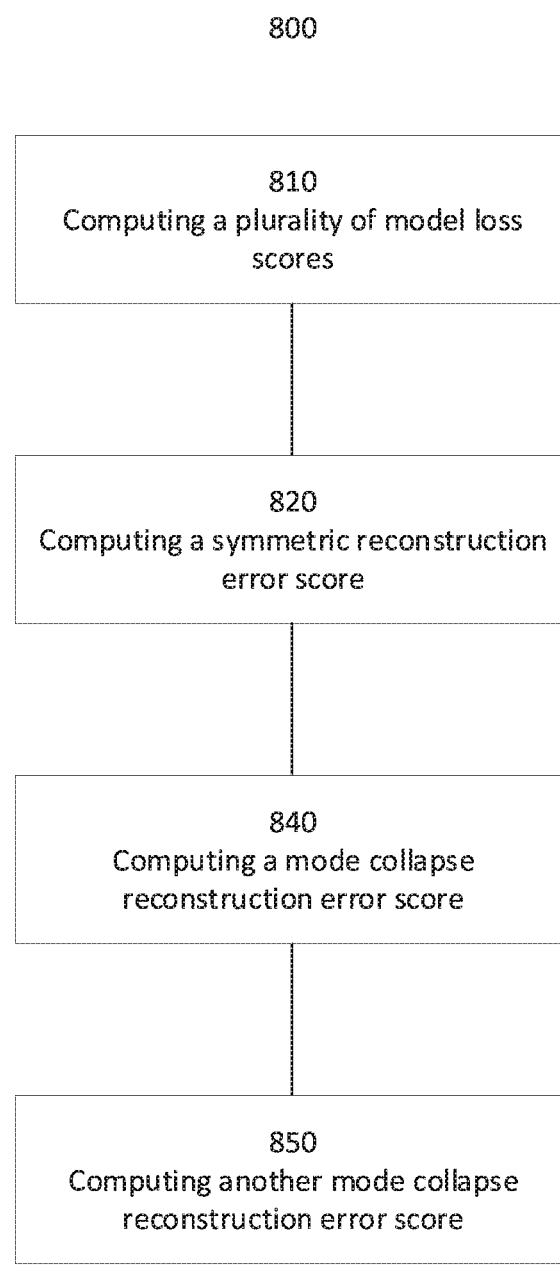
FIG. 8 is a flowchart schematically representing an optional flow of operations for computing a difference, according to some embodiments of the present invention.

Reference is now made also to FIG. 8, showing a flowchart schematically representing an optional flow of operations for computing a difference, according to some embodiments of the present invention. In such embodiments, in 810 processor 590 computes for each set-operator prediction model of the plurality of set-operator prediction models a model loss score using the respective score set of the respective output set of labels, i.e. the respective model output set of labels. Optionally, the model loss score is a value between 0 and 1 inclusive. Optionally, the model loss score is greater than 0. Optionally, the model loss score is less than 1. Optionally, the model loss score is greater than 1. Optionally, the model loss score is less than 0. Optionally, the model loss score is indicative of the difference between the respective model target set of labels and a respective model output set of labels, predicted by one or more classification model 520 in response to the respective model output group of features. Optionally, the model loss score is computed by applying a Binary Cross-Entropy method, also known as Sigmoid Cross Entropy (BC) to the respective score set and the respective target set of labels. Optionally, to compute the loss score, processor 590 computes a sum of a plurality of model loss scores each computed for one of the plurality of set-operator prediction models.

A symmetric reconstruction error score is a score indicative of a difference between two results of a symmetric operation. For example, when a symmetric intersection operation, depicted by ∩, is applied to a first set depicted by A and a second set depicted by B, a symmetric reconstruction error score is indicative of a difference between (A∩B) and (B∩A).

For some of the plurality of set-operator prediction models, processor 590 optionally computes in 820 a symmetric reconstruction error score, for example for set-operator prediction model 510A associated with intersection and additionally or alternatively for set-operator prediction model 510B associated with union. Optionally, providing the plurality of groups of training features to each of the plurality of set-operator prediction models in 605 comprises providing to at least one set-operator prediction model of the plurality of set-operator prediction models a first group of training features of the plurality of groups of training features as a first input and a second group of training features of the plurality of groups of training features as a second input, to produce a first model group of features. Reference is now made again to FIG. 5. In this example, group of training features 512 is provided to set-operator prediction model 510A as a first input and group of training features 513 is provided to set-operator prediction model 510A as a second input.

Reference is now made again to FIG. 8. For at least one of the plurality of set-operator prediction models, for example set-operator prediction model 510A, in 820 processor 590 provides to the at least one set-operator prediction model the first group of training features as the second input and the second group of training features as the first input, to produce a second model group of features. Optionally, processor 590 applies a mean square error method to the first model group of features and the second model group of features to produce a symmetric reconstruction error score. Optionally processor 590 uses the symmetric reconstruction error score when computing the loss score, for example by adding the symmetric reconstruction error score to the sum of the plurality of model loss scores.

There is a known risk in training a neural network of reaching a state where the neural network generates a common output for a plurality of input samples. This condition is sometimes called mode collapse. To reduce a risk of mode collapse when training the plurality of set-operator prediction models, processor 590 optionally computes one or more mode-collapse reconstruction errors, each indicative of a difference between an original group of features and a reconstructed group of features computed by applying a union operator to an intersection of the original group of features and another group of features and a subtraction of the other group of features from the original group of features. When A depicts the original group of features, B depicts the other group of features, ∪ depicts a union operator, ∩ depicts an intersection operator, and/depicts a subtraction operator, a mode-collapse reconstruction error score is indicative of a difference between A and ((A∩B)∪ (A/B)).

In 840 processor 590 optionally computes a mode-collapse reconstruction error for a first group of training features, for example group of training features 512, optionally by executing software object 531. Optionally, a target intersection group of features associated with set-operator prediction model 510A is computed by applying an intersection operator to at least two first groups of features, for example group of training features 512 and group of training features 513. Optionally, a target subtraction group of features associated with set-operator prediction model 510C is computed by applying a subtraction operator to at least two second groups of features, for example group of training features 512 and group of training features 513. Optionally, a target union group of features associated with set-operator prediction model 510B is computed by applying a union operator to at least two third groups of features, for example group of training features 512 and group of training features 513. Optionally, in 840 processor 590 provides group of training features 512 and group of training features 513 to set-operator prediction model 510A to produce an intersection group of features. Optionally, processor 590 provides group of training features 512 and group of training features 513 to prediction model 510C to produce a subtraction group of features. Optionally, processor 590 provides the subtraction group of features and the intersection group of features to prediction model 510B to produce a union group of features. Optionally, processor 590 applies a mean square error method to the union group of features and group of training features 512 to produce a mode-collapse reconstruction error score. Optionally processor 590 uses the mode-collapse reconstruction error score when computing the loss score, for example by adding the mode-collapse reconstruction error score to the sum of the plurality of model loss scores.

In 850 processor 590 optionally computes a mode-collapse reconstruction error for a second group of training features, for example group of training features 513. Optionally, processor 590 provides group of training features 513 and group of training features 512 to prediction model 510C to produce another subtraction group of features. Optionally, processor 590 provides the other subtraction group of features and the intersection group of features to prediction model 510B to produce another union group of features. Optionally, processor 590 applies a mean square error method to the other union group of features and group of training features 513 to produce another mode-collapse reconstruction error score. Optionally processor 590 uses the other mode-collapse reconstruction error score when computing the loss score, for example by adding the other mode-collapse reconstruction error score to mode-collapse reconstruction error score.

Reference is now made again to FIG. 6. Optionally, in 620 processor 590 modifies one or more model values of at least one of the plurality of set-operator prediction models to reduce another loss score. Optionally processor 590 repeats 601, 605, 608, 612, and 620 in each of a plurality of iterations. Optionally the other loss score is computed in another iteration of the plurality of iterations.

Optionally, processor 590 is further adapted to training one or more multi-label classification model 520 in at least some of the plurality of iteration. In 630, processor 590 optionally computes a multi-label classification loss score using the plurality of output sets of labels and the plurality of input sets of labels. Optionally, to compute the multi-label classification loss score processor 590 computes for each of some of the plurality of training images a set of classification scores. A cross-entropy loss value is a value indicative of the performance of a classification model whose output is a probability value between 0 and 1. A cross-entropy loss value increases as a predicted probability of a label diverges from an actual label. Optionally, processor 590 computes the set of classification scores by providing the respective training image to the one or more multi-label classification model and optionally computing a binary cross-entropy loss value for the set of classification scores and the respective input set of labels. In 640, processor 590 optionally modifies one or more classification model values of one or more multi-label classification model 520 to reduce another multi-label classification loss score computed in another iteration of the plurality of iterations. Optionally, the one or more multi-label classification model is trained in a first subset of the plurality of iterations which is different from a second subset of the plurality of iterations where the plurality of set-operator prediction models is trained. Optionally, in an iteration where processor 590 updates the one or more model values processor 590 does not update the one or more classification model values. Optionally, in another iteration where processor 590 updates the one or more classification model values processor 590 does not update the one of more model values.

According to some embodiments of the present invention, one or more groups of features produced by system 200 implementing method 300 may be provided by processor 201 to at least one multi-label classification model for the purpose of training the at least one multi-label classification model. Optionally, the at least one multi-label classification model is a neural network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant label set loss score will be developed and the scope of the term label set loss score is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for generating a set of digital image features, comprising at least one hardware processor adapted for:
producing a plurality of input groups of features, each produced by extracting a plurality of features from one of a plurality of digital images;
computing an output group of features by inputting the plurality of input groups of features into at least one prediction model trained to produce a model group of features in response to at least two groups of features, such that a model set of labels indicative of the model group of features is similar, according to at least one similarity test, to a target set of labels computed by applying at least one set operator to a plurality of input sets of labels each indicative of one of the at least two groups of features; and providing the output group of features to at least one other hardware processor for the purpose of performing at least one feature related task;

wherein the at least one prediction model comprises a first prediction model and a second prediction model;
  wherein the first prediction model is associated with a first set operator applied to another plurality of input sets of labels, each indicative of a plurality of features of one of the plurality of digital images;
  wherein the second prediction model is associated with a second set operator applied to the other plurality of input sets of labels;
  wherein computing the output group of features comprises:
    computing a first intermediate group of features by inputting into the first prediction model a first plurality of groups of features; and
    computing a second intermediate group of features by inputting into the second prediction model a second plurality of groups of features;
  wherein the second plurality of groups of features comprises the first intermediate group of features.

2. The system of claim 1, wherein the at least one prediction model is trained using a loss score, where computing the loss score comprises:
  computing the target set of labels by applying the at least one set operator to the plurality of input sets of labels;
  computing the model set of labels by providing the model group of features to at least one classification model; and
  computing a difference between the target set of labels and the model set of labels.

3. The system of claim 1, wherein at least one of the at least one set operator is selected from a group of set operators consisting of: union, intersection, and subtraction.

4. The system of claim 1, wherein the output group of features is the second intermediate group of features.

5. The system of claim 1, wherein at least some of the plurality of input groups of features are included in at least one of: the first plurality of groups of features, and the second plurality of groups of features.

6. The system of claim 1, wherein access to the plurality of digital images is by at least one of: receiving the plurality of digital images from at least one other hardware processor, and retrieving the plurality of digital images from at least one non-volatile digital storage, connected to the at least one hardware processor.

7. The system of claim 1, wherein at least one of the at least one prediction model is a neural network.

8. The system of claim 1, wherein at least one of the at least one feature related task is selected from a group of tasks consisting of: generating a digital image, retrieving a digital image, and training at least one other classification model.

9. A system for generating a set of digital image features, comprising at least one hardware processor adapted for:
  producing a plurality of input groups of features, each produced by extracting a plurality of features from one of a plurality of digital images;
  computing an output group of features by inputting the plurality of input groups of features into at least one prediction model trained to produce a model group of features in response to at least two groups of features, such that a model set of labels indicative of the model group of features is similar, according to at least one similarity test, to a target set of labels computed by applying at least one set operator to a plurality of input sets of labels each indicative of one of the at least two groups of features; and providing the output group of features to at least one other hardware processor for the purpose of performing at least one feature related task;
  wherein the at least one prediction model is trained using a loss score, where computing the loss score comprises:
    computing the target set of labels by applying the at least one set operator to the plurality of input sets of labels;
    computing the model set of labels by proving the model group of features to at least one classification model; and
    computing a difference between the target set of labels and the model set of labels
  wherein training the at least one prediction model comprises:
    in each of a plurality of iterations:
      generating a plurality of groups of training features, each group of training features extracted from one of the plurality of training images;
      providing the plurality of groups of training features to each of a plurality of set-operator prediction models, each set-operator prediction model associated with one of a plurality of set operators and adapted to produce one of a plurality of model output groups of features corresponding to a model target set of labels computed by applying the respective set operator to the plurality of input sets of labels;
      providing the plurality of model output groups of features to at least one multi-label classification model to produce a plurality of output sets of labels, each output set of labels associated with one of the plurality of model output groups of features and having a score set comprising a plurality of label-scores, each label-score indicative of a confidence of identifying by the at least one multi-label classification model one label of the output set of labels in respective model output group of features;
      computing the loss score using the plurality of output sets of labels and the plurality of input sets of labels; and
      modifying at least one model value of at least one of the plurality of set-operator prediction models to reduce another loss score computed in another iteration of the plurality of iterations.

10. The system of claim 9, wherein computing the loss score comprises computing for each of the plurality of set-operator prediction models a model loss score, using the respective score set of the respective output set of labels, where the model loss score is indicative of the difference between the respective model target set of labels and a respective model output set of labels, predicted by at least one classification model for the model output group of features.

11. The system of claim 9, wherein providing the plurality of groups of training features to each of the plurality of set-operator prediction models comprises providing to at least one set-operator prediction model of the plurality of set-operator prediction models a first group of training features of the plurality of groups of training features as a first input and a second group of training features of the plurality of groups of training features as a second input, to produce a first model group of features; and
  wherein computing the loss score further comprises:
    providing to the at least one set-operation prediction model the first training group of features as the second input and the second group of training features as the first input, to produce a second model group of features;

applying a mean square error method to the first model group of features and the second model group of features to produce a symmetric reconstruction error score; and computing the loss score further using the symmetric reconstruction error score.

12. The system of claim 9, wherein the plurality of set-operator prediction models comprises an intersection model of the plurality of set-operator prediction models such that a target intersection group of features of the intersection model is computed by applying an intersection operator to at least two first groups of features provided to the intersection model;

wherein the plurality of set-operator prediction models comprises a subtraction model of the plurality of set-operator prediction models, such that a target subtraction group of features of the subtraction model is computed by applying a subtraction operator to at least two second groups of features provided to the subtraction model;

wherein the plurality of set-operator prediction models comprises a union model of the plurality of set-operator prediction models, such that a target union group of features of the third model is computed by applying a union operator to at least two third groups of features provided to the union model; and wherein computing the loss score further comprises:
providing a first group of features and a second group of features, both of the plurality of groups of training features, to the intersection model to produce an intersection group of features;
providing the first group of features and the second group of features to the subtraction model to produce a subtraction group of features;
providing the subtraction group of features and the intersection group of features to the union model, to produce a union group of features;
applying a mean square error method to the union group of features and the first group of features to produce a mode-collapse reconstruction error score; and
computing the loss score further using the mode-collapse reconstruction error score.

13. The system of claim 12, wherein computing the loss score further comprises:
providing the second group of features and the first group of features to the subtraction model to produce another subtraction group of features;
providing the other subtraction group of features and the intersection group of features to the union model to produce a another union group of features;
applying the mean square error method to the other union group of features and the second group of features to produce another mode-collapse reconstruction error score; and
computing the loss score further using the other mode-collapse reconstruction error score.

14. The system of claim 9, further comprising training the at least one multi-label classification model comprising:
in at least some of the plurality of iterations:
computing a multi-label classification loss score using the plurality of output sets of labels and the plurality of input sets of labels; and
modifying at least one classification model value of the at least one multi-label classification model to reduce another multi-label classification loss score computed in another iteration of the plurality of iterations;

wherein computing the multi-label classification loss score comprises, for each of some of the plurality of training images:
computing a set of classification scores by providing the training image to the at least one multi-label classification model; and
computing a binary cross-entropy loss value for the set of classification scores and the respective input set of labels.

15. The system of claim 9, wherein the plurality of training images comprises a plurality of training image pairs each comprising two of the plurality of training images; and
wherein the plurality of groups of training features comprises two groups of training features, each extracted from one of the two training images of one of the plurality of training image pairs.

16. The system of claim 9, wherein at least one of the plurality of set-operator prediction models is another neural network; and
wherein the at least one multi-label classification model is a second other neural network.

17. A system for training a plurality of set-operation prediction models, comprising at least one hardware processor adapted to:
in each of a plurality of iterations:
generating a plurality of groups of training features, each group of training features extracted from one of a plurality of training images, each training image having an input set of labels indicative of a plurality of training features of the respective training image;
providing the plurality of groups of training features to each of a plurality of set-operator prediction models, each set-operator prediction model associated with one of a plurality of set operators and adapted to produce one of a plurality of model output groups of features corresponding to a model target set of labels computed by applying the respective set operator to a plurality of input sets of labels of the plurality of training images;
providing the plurality of model output groups of features to at least one multi-label classification model to produce a plurality of output sets of labels, each output set of labels associated with one of the plurality of model output groups of features and having a score set comprising a plurality of label-scores, each label-score indicative of a confidence of identifying by the at least one multi-label classification model one label of the output set of labels in respective model output group of features;
computing a loss score using the plurality of output sets of labels and the plurality of input sets of labels; and
modifying at least one model value of at least one of the plurality of set-operator prediction models to reduce another loss score computed in another iteration of the plurality of iterations;

wherein the at least one prediction model comprises a first prediction model and a second prediction model;
wherein the first prediction model is associated with a first set operator applied to another plurality of input sets of labels, each indicative of a plurality of features of one of the plurality of digital images;
wherein the second prediction model is associated with a second set operator applied to the other plurality of input sets of labels;

wherein computing the output group of features comprises:
  computing a first intermediate group of features by inputting into the first prediction model a first plurality of groups of features; and
  computing a second intermediate group of features by inputting into the second prediction model a second plurality of groups of features;
    wherein the second plurality of groups of features comprises the first intermediate group of features.

18. The system of claim 17, wherein computing the loss score comprises for at least one model of the plurality of set-operation prediction models:
  computing a target set of labels by applying at least one set operator associated with the at least one model to the plurality of input sets of labels; and
  computing a difference between the target set of labels and at least one output set of labels of the respective at least one model.

* * * * *